(12) United States Patent
Allain et al.

(10) Patent No.: US 10,011,494 B2
(45) Date of Patent: *Jul. 3, 2018

(54) PROCESS FOR PREPARING PRECIPITATED SILICA

(71) Applicant: RHODIA OPERATIONS, Paris (FR)

(72) Inventors: Emmanuelle Allain, L'Hay les Roses (FR); Sylvaine Neveu, Paris (FR)

(73) Assignee: Rhodia Operations, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/373,799

(22) PCT Filed: Jan. 23, 2013

(86) PCT No.: PCT/EP2013/051237
§ 371 (c)(1),
(2) Date: Jul. 22, 2014

(87) PCT Pub. No.: WO2013/110658
PCT Pub. Date: Aug. 1, 2013

(65) Prior Publication Data
US 2015/0266743 A1   Sep. 24, 2015

(30) Foreign Application Priority Data
Jan. 25, 2012   (FR) ...................................... 12 00213

(51) Int. Cl.
*C01B 33/12*   (2006.01)
*C01B 33/193*   (2006.01)

(52) U.S. Cl.
CPC .......... *C01B 33/128* (2013.01); *C01B 33/193* (2013.01)

(58) Field of Classification Search
CPC ............................ C01B 33/128; C01B 33/193
See application file for complete search history.

(56) References Cited

U.S. PATENT DOCUMENTS

| | | |
|---|---|---|
| 5,547,502 A | 8/1996 | Chevallier et al. |
| 5,871,867 A | 2/1999 | Rausch et al. |

FOREIGN PATENT DOCUMENTS

| | | |
|---|---|---|
| EP | 0520862 A1 | 12/1992 |
| EP | 0754650 A1 | 1/1997 |
| WO | 2010022544 A1 | 3/2010 |
| WO | WO 2011/026893 A1 | 3/2011 |
| WO | WO 2013/092745 A | 6/2013 |
| WO | WO 2013/092749 A1 | 6/2013 |
| WO | WO 2013/110654 A1 | 8/2013 |
| WO | WO 2013/110655 A1 | 8/2013 |
| WO | WO 2013/110659 A1 | 8/2013 |

OTHER PUBLICATIONS

U.S. Appl. No. 14/367,425, Clouin et al.
U.S. Appl. No. 14/367,455, Clouin et al.
U.S. Appl. No. 14/373,791, Allain et al.
U.S. Appl. No. 14/373,797, Allain et al.
U.S. Appl. No. 14/373,801, Allain.

*Primary Examiner* — Melvin C. Mayes
*Assistant Examiner* — Michael Forrest

(57) ABSTRACT

A process for preparing precipitated silica in which: (i) an aqueous stock having a concentration of alkali metal silicate less than 20 g/L is formed; (ii) acid is added to said initial stock, until at least 50% of the amount of $M_2O$ is neutralized; (iii) silicate and acid are simultaneously added, such that the degree of consolidation is greater than 4 and at most 100; (iv) silicate and acid are simultaneously added, such that the pH of the reaction medium is between 7 and 10; (v) acid is added until a pH value of between 2.5 and 5.3 is obtained; and (vi) the reaction medium is placed in contact with acid and silicate, such that the pH is between 2.5 and 5.3, wherein the acid used in at least one of the process steps is a concentrated acid.

14 Claims, No Drawings

PROCESS FOR PREPARING PRECIPITATED SILICA

The present application is a U.S. national stage entry under 35 U.S.C. § 371 of International Application No. PCT/EP2013/051237 filed Jan. 23, 2013, which claims priority to French Application No. 12.00213 filed on Jan. 25, 2012, this application being herein incorporated by reference for all purposes.

The present invention relates to a novel process for preparing precipitated silica.

It is known practice to use precipitated silicas as a catalyst support, as an absorbent for active materials (in particular supports for liquids, for example those used in food, such as vitamins (especially vitamin E), choline chloride), as a viscosity enhancer, texturizer or anticaking agent, as a battery separator element, as an additive for toothpaste, for paper.

Precipitated silicas may also be used as reinforcing fillers in silicone matrices (for example for coating electric cables) or in compositions based on natural or synthetic polymer(s), in particular elastomer(s), which are especially diene-based, for example for footwear soles, floor coverings, gas barriers, fire-retardant materials and also technical components such as cableway rollers, seals for domestic electrical appliances, seals for liquid or gas pipes, braking system seals, sheaths, cables and transmission belts.

It is thus known practice to prepare, by performing a precipitation reaction between a silicate and a dilute acid, precipitated silicas that may be used as reinforcing fillers for polymer compositions.

The main objective of the present invention is to propose a novel process for preparing precipitated silica, which constitutes an alternative to the known processes for preparing precipitated silica.

More preferentially, one of the aims of the present invention consists in providing a process which has improved productivity, in particular in the precipitation reaction, especially in comparison with the preparation processes of the prior art using, as acid, a dilute acid, and which makes it possible to obtain precipitated silicas that have physico-chemical characteristics and properties comparable to those of the precipitated silicas obtained via these preparation processes of the prior art.

Another aim of the invention preferentially consists, at the same time, in reducing the amount of energy consumed and/or the amount of water employed during the preparation of precipitated silica, in particular in comparison with the processes of the prior art using, as acid, a dilute acid.

Thus, the object of the invention is a novel process for preparing precipitated silica, comprising the reaction of a silicate with at least one acid, whereby a silica suspension is obtained, followed by the separation and drying of this suspension, in which the reaction of the silicate with the acid is performed according to the following successive steps:

(i) an initial aqueous stock comprising alkali metal M silicate is formed, the silicate concentration (expressed as $SiO_2$) in said stock being less than 20 g/L, preferably at most 15 g/L, (ii) acid is added to said initial stock, until at least 50% of the amount of $M_2O$ present in said initial stock is neutralized, (iii) alkali metal M silicate and acid are simultaneously added to the reaction medium, such that the ratio of the amount of silicate added (expressed as $SiO_2$)/amount of silicate present in the initial stock (expressed as $SiO_2$) is greater than 4 and at most 100, preferably between 12 and 100, in particular between 12 and 50, (iv) the addition of the silicate is stopped while continuing the addition of the acid to the reaction medium until a pH value in the reaction medium of between 2.5 and 5.3, preferably between 2.8 and 5.2, is obtained, (v) the reaction medium obtained after step (iv) (thus having a pH of between 2.5 and 5.3, preferably between 2.8 and 5.2) is placed in contact (mixture) with acid and silicate, such that the pH of the reaction medium is maintained between 2.5 and 5.3, preferably between 2.8 and 5.2, in which process:

in at least part of step (iii) (i.e., in, at the minimum, part or all of step (iii)) and/or in at least step (v) the acid used is a concentrated acid, preferably selected from the group consisting of sulfuric acid with a concentration of at least 80% by weight, in particular of at least 90% by weight, acetic acid or formic acid with a concentration of at least 90% by weight, nitric acid with a concentration of at least 60% by weight, phosphoric acid with a concentration of at least 75% by weight, hydrochloric acid with a concentration of at least 30% by weight.

Advantageously, said concentrated acid is concentrated sulfuric acid, i.e., sulfuric acid with a concentration of at least 80% by weight, preferably of at least 90% by weight.

Sulfuric acid with a concentration of at least 1400 g/L and in particular of at least 1650 g/L may thus be used as concentrated acid.

It is possible, in an optional subsequent step (vi), to add, to the reaction medium obtained after step (v), an alkaline agent, preferably a silicate, this being done until a pH value of the reaction medium of between 4.7 and 6.3, preferably between 5.0 and 5.8, for example between 5.0 and 5.4, is reached.

According to a variant (A) of the process of the invention, the acid used in step (v) is a concentrated acid as defined above.

The acid used in steps (ii), (iii) and (iv) may then be, for example, a dilute acid, advantageously dilute sulfuric acid, i.e., having a concentration very much less than 80% by weight, in this instance a concentration of less than 20% by weight (and in general of at least 4% by weight), in particular of less than 14% by weight, especially of at most 10% by weight, for example between 5% and 10% by weight.

According to a preferred variant of the invention (variant (B)), the invention is a novel process for preparing precipitated silica, comprising the reaction of a silicate with at least one acid, whereby a silica suspension is obtained, followed by the separation and drying of this suspension, in which the reaction of the silicate with the acid is performed according to the following successive steps:

(i) an initial aqueous stock comprising alkali metal M silicate is formed, the silicate concentration (expressed as $SiO_2$) in said stock being less than 20 g/L, preferably at most 15 g/L, (ii) acid is added to said initial stock, until at least 50% of the amount of $M_2O$ present in said initial stock is neutralized, (iii) alkali metal M silicate and acid are simultaneously added to the reaction medium, such that the ratio of the amount of silicate added (expressed as $SiO_2$)/amount of silicate present in the initial stock (expressed as $SiO_2$) is greater than 4 and at most 100, preferably between 12 and 100, in particular between 12 and 50, (iv) the addition of the silicate is stopped while continuing the addition of the acid to the reaction medium until a pH value in the reaction medium of between 2.5 and 5.3, preferably between 2.8 and 5.2, is obtained, (v) the reaction medium obtained after step (iv) (thus having a pH of between 2.5 and 5.3, preferably between 2.8 and 5.2) is placed in contact (mixture) with acid and silicate, such that the pH of the reaction medium is maintained between 2.5 and 5.3, preferably between 2.8 and 5.2, in which process, in at least part of step (iii) (i.e., in, at the minimum, part or all of step (iii)), the acid used is a concentrated acid, preferably selected from the group consisting of sulfuric acid with a concentration of at least 80% by weight, in particular of at least 90% by weight, acetic acid or formic acid with a concentration of at least 90% by weight, nitric acid with a concentration of at least 60% by weight, phosphoric acid with a concentration of at least 75% by weight, hydrochloric acid with a concentration of at least 30% by weight.

Advantageously, said concentrated acid is concentrated sulfuric acid, i.e., sulfuric acid with a concentration of at least 80% by weight, preferably of at least 90% by weight.

Sulfuric acid with a concentration of at least 1400 g/L, in particular of at least 1650 g/L, may thus be used as concentrated acid.

Thus, according to one of the essential characteristics of variant (B), taken in combination with a sequence of steps with specific conditions, in particular a certain concentration of alkali metal silicate and also an appropriate ratio of the amount of silicate added (expressed as $SiO_2$)/amount of silicate present in the initial stock (expressed as $SiO_2$), the acid used in part of step (iii), preferentially in step (iii) (i.e., in the entirety of step (iii)), is a concentrated acid, preferably selected from the group consisting of sulfuric acid with a concentration of at least 80% by weight, in particular of at least 90% by weight, acetic acid or formic acid with a concentration of at least 90% by weight, nitric acid with a concentration of at least 60% by weight, phosphoric acid with a concentration of at least 75% by weight, hydrochloric acid with a concentration of at least 30% by weight.

Advantageously, said concentrated acid is concentrated sulfuric acid, i.e., sulfuric acid with a concentration of at least 80% by weight (and in general of at most 98% by weight), preferably of at least 90% by weight; in particular, its concentration is between 90% and 98% by weight, for example between 91% and 97% by weight.

According to one embodiment of variant (B), the concentrated acid as defined above is used only in step (iii).

The acid used in steps (ii), (iv) and (v) may then be, for example, a dilute acid, advantageously dilute sulfuric acid, i.e., having a concentration very much less than 80% by weight, in this instance a concentration of less than 20% by weight (and in general of at least 4% by weight), in particular of less than 14% by weight, especially of at most 10% by weight, for example between 5% and 10% by weight.

Preferably, the acid used in step (iv) is also a concentrated acid as mentioned above.

However, according to a preferred embodiment of variant (B), the acid used in steps (iv) and (v) is also a concentrated acid as mentioned above.

In the context of this preferred embodiment of variant (B), the acid used in the entirety of step (ii) may then be, for example, a dilute acid as described above; it may be advantageous, in this variant of the invention, for, in at least part of step (ii), in general in a second and last part of this step (ii), the acid used to also be a concentrated acid as mentioned above (the acid used in the other part of step (ii) being, for example, a dilute acid as described above).

In the context of this preferred embodiment of variant (B), the acid used in the entirety of step (ii) may also be a concentrated acid as mentioned above, advantageously concentrated sulfuric acid, i.e., having a concentration of at least 80% by weight, preferably of at least 90% by weight, in particular of between 90% and 98% by weight. Preferably, in the case of this use, water is added to the initial stock, in particular either before step (ii) or during step (ii).

In the process according to the invention, the choice of the acid, of the optional alkaline agent and of the alkali metal M silicate is made in a manner that is well known per se.

An organic acid such as acetic acid, formic acid or carbonic acid or, preferably, a mineral acid such as sulfuric acid, nitric acid, phosphoric acid or hydrochloric acid is generally used as acid(s) (concentrated acid or dilute acid).

If use is made, as concentrated acid, of concentrated acetic acid or concentrated formic acid, then their concentration is at least 90% by weight.

If use is made, as concentrated acid, of concentrated nitric acid, then its concentration is at least 60% by weight.

If use is made, as concentrated acid, of concentrated phosphoric acid, then its concentration is at least 75% by weight.

If use is made, as concentrated acid, of concentrated hydrochloric acid, then its concentration is at least 30% by weight.

However, very advantageously, use is made, as acid(s) of sulfuric acid(s), the concentrated sulfuric acid then used having a concentration such as already mentioned thereabove.

In general, when concentrated acid is used in several steps, the same concentrated acid is then used.

Use may furthermore be made, as silicate, of any common form of silicates, such as metasilicates, disilicates and advantageously an alkali metal M silicate in which M is sodium or potassium.

Silicate may have a concentration (expressed as $SiO_2$) of between 2 and 330 g/L, for example between 3 and 300 g/L, in particular between 4 and 260 g/L.

Generally, use is made, as silicate, of sodium silicate.

In the case where use is made of sodium silicate, the latter generally has a $SiO_2/Na_2O$ weight ratio of between 2.5 and 4, for example between 3.2 and 3.8.

The alkaline agent used during the optional step (vi) may be, for example, a sodium hydroxide, potassium hydroxide or ammonia solution. Preferably, this alkaline agent is silicate, in particular silicate as used in the preceding steps.

In the preparation process of the invention, the reaction of the silicate with the acid takes place in a very specific manner according to the following steps.

An aqueous stock which comprises silicate is first formed (step (i)).

The silicate concentration (expressed as $SiO_2$) in this stock is less than 20 g/L.

This concentration is preferably at most 15 g/L, in particular at most 11 g/L, for example at most 8 g/L.

The stock formed in step (i) may optionally comprise an electrolyte. However, preferably, no electrolyte is added during the preparation process, in particular in step (i).

The term "electrolyte" is understood here in its generally accepted sense, i.e., it means any ionic or molecular substance which, when in solution, decomposes or dissociates to form ions or charged particles. Electrolytes that may be mentioned include a salt of the group of alkali metal and alkaline-earth metal salts, especially the salt of the starting silicate metal and of the acid, for example sodium chloride in the case of the reaction of a sodium silicate with hydrochloric acid, or, preferably, sodium sulfate in the case of the reaction of a sodium silicate with sulfuric acid.

The second step (step (ii)) consists in adding acid to the initial stock.

Thus, in this second step, acid is added to said initial stock, until at least 50%, in particular 50% to 99%, of the amount of $M_2O$ present in said initial stock is neutralized.

Once the desired value of the amount of neutralized $M_2O$ is reached, a simultaneous addition (step (iii)) of acid and of an amount of alkali metal M silicate is then performed such that the degree of consolidation, i.e., the ratio of the amount of silicate added (expressed as $SiO_2$)/amount of silicate present in the initial stock (expressed as $SiO_2$), is greater than 4 and at most 100.

According to one variant of the process of the invention, this simultaneous addition of acid and of an amount of alkali metal M silicate is performed such that the degree of consolidation is preferably between 12 and 100, in particular between 12 and 50, especially between 13 and 40.

According to another variant of the process of the invention, this simultaneous addition of acid and of an amount of alkali metal M silicate is performed such that the degree of consolidation is, rather, greater than 4 and less than 12, in particular between 5 and 11.5, especially between 7.5 and 11. This variant is generally performed when the silicate concentration in the initial stock is at least 8 g/L, in particular between 10 and 15 g/L, for example between 11 and 15 g/L.

Preferably, in the entirety of step (iii), the amount of acid added is such that 80% to 99%, for example 85% to 97%, of the amount of $M_2O$ added is neutralized.

In step (iii), it is possible to perform the simultaneous addition of acid and silicate at a first pH stage of the reaction medium, $pH_1$, followed by a second pH stage of the reaction medium, $pH_2$, such that $7<pH_2<pH_1<9$.

Next, in a step (iv), the addition of the silicate is stopped while continuing the addition of acid to the reaction medium so as to obtain a pH value in the reaction medium of between 2.5 and 5.3 (for example between 3.0 and 5.3), preferably between 2.8 and 5.2 (for example between 4.0 and 5.2), in particular between 3.5 and 5.1 (or even between 3.5 and 5.0).

It is optionally possible to perform, just after this step (iv), maturation of the reaction medium, especially at the pH obtained after step (iv), and in general with stirring; this maturation may last, for example, from 2 to 45 minutes, in particular from 5 to 20 minutes, and preferentially does not comprise any addition of acid or addition of silicate.

Next, the following are placed in contact (step (v)):
the reaction medium obtained after step (iv), said reaction medium thus having a pH of between 2.5 and 5.3, preferably between 2.8 and 5.2, for example between 3.5 and 5.1 (or even between 3.5 and 5.0),
with acid and silicate (in particular alkali metal M silicate), such that (in particular at rates such that) the pH of the reaction medium obtained is maintained between 2.5 and 5.3 (for example between 3.0 and 5.3), preferably between 2.8 and 5.2 (for example between 4.0 and 5.2), for example between 3.5 and 5.1 (or even between 3.5 and 5.0).

Said pH of the reaction medium may vary within the range 2.5-5.3, preferably the range 2.8-5.2, for example the range 3.5-5.1 (or even 3.5-5.0), or preferably remain (substantially) constant within these ranges.

In general, in this step (v), the placing in contact of the reaction medium obtained from step (iv) with the acid and the silicate (for example the alkali metal M silicate) is performed by adding acid and silicate to said reaction medium.

According to a variant of the process of the invention, in step (v), the acid is first added to said reaction medium, followed by the silicate.

However, according to a preferred variant of the process of the invention, in step (v), the acid and the silicate (for example the alkali metal M silicate) are instead added simultaneously to said reaction medium; preferably, this simultaneous addition is performed with regulation of the pH of the reaction medium obtained during this addition at a (substantially) constant value within the abovementioned ranges.

Step (v) is generally performed with stirring.

The optional step (vi) of the process according to the invention consists in adding, to the reaction medium obtained after step (v), an alkaline agent, preferably a silicate (in particular alkali metal M silicate), this being done until a pH value of the reaction medium of between 4.7 and 6.3, preferably between 5.0 and 5.8, for example between 5.0 and 5.4, is reached.

This step (vi) is usually performed with stirring.

In general, all of the reaction steps (steps (i) to (v), or (vi) where appropriate) are performed with stirring.

All the steps (i) to (v), or (vi) where appropriate, are usually performed between 75 and 97° C., preferably between 80 and 96° C.

According to one variant of the process of the invention, all of the steps are performed at a constant temperature.

According to another variant of the process of the invention, whether step (ii) is performed (entirely or partly) or is not performed with concentrated acid, the reaction end temperature is higher than the reaction start temperature: thus, the temperature at the start of the reaction (for example during steps (i) and (ii)) is preferably maintained between 75 and 90° C., then the temperature is increased, preferably up to a value of between 90 and 97° C., at which value it is maintained (for example during steps (iii) to (vi)) until the end of the reaction.

It may be advantageous, on conclusion of step (v), or of the optional step (vi), to perform maturation of the reaction medium obtained, in particular at the pH obtained on conclusion of this step (v) (or of step (vi)), and generally with stirring. This maturation may last, for example, from 2 to 30 minutes, in particular from 3 to 20 minutes, and can be carried out between 75 and 97° C., preferably between 80 and 96° C., in particular at the temperature at which step (v) (or step (vi)) has been performed. It preferably comprises neither addition of acid nor addition of silicate.

In the process according to the invention, step (v) may be performed in a rapid mixer or in a region of turbulent flow, which can permit better control of the characteristics of the precipitated silicas obtained.

For example, in the case where, in step (v), first the acid and then the silicate (for example alkali metal M silicate) are added to the reaction medium obtained after step (iv), then said silicate can be placed in contact with the medium resulting from the addition of the acid to the reaction medium obtained from step (iv) in a rapid mixer or in a region of turbulent flow.

Similarly, in the case where, in step (v), the acid and the silicate (for example alkali metal M silicate) are added simultaneously to the reaction medium obtained from step (iv), then said acid and said silicate may be placed in contact with said reaction medium in a rapid mixer or in a region of turbulent flow.

Preferably, the reaction medium obtained in the rapid mixer or in a region of turbulent flow feeds a reactor, preferably subjected to stirring, in which reactor the optional step (vi) is performed.

In step (v), use may be made of a rapid mixer selected from symmetrical T-shaped or Y-shaped mixers (or tubes), asymmetrical T-shaped or Y-shaped mixers (or tubes), tangential jet mixers, Hartridge-Roughton mixers, vortex mixers, rotor-stator mixers.

Symmetrical T-shaped or Y-shaped mixers (or tubes) generally consist of two opposing tubes (T-shaped tubes) or two tubes forming an angle of less than 180° (Y-shaped tubes), of the same diameter, discharging into a central tube, the diameter of which is identical to or greater than that of the two preceding tubes. They are said to be "symmetrical" because the two tubes for injecting the reactants exhibit the same diameter and the same angle with respect to the central tube, the device being characterized by an axis of symmetry. Preferably, the central tube has a diameter approximately twice as large as the diameter of the opposing tubes; similarly, the fluid velocity in the central tube is preferably equal to half that in the opposing tubes.

However, it is preferable to employ, in particular when the two fluids to be introduced do not have the same flow rate, an asymmetrical T-shaped or Y-shaped mixer (or tube) rather than a symmetrical T-shaped or Y-shaped mixer (or tube). In the asymmetrical devices, one of the fluids (generally the fluid with the lower flow rate) is injected into the central tube by means of a side tube of smaller diameter. The latter forms an angle generally of 90° with the central tube (T-shaped tube); this angle may be other than 90° (Y-shaped tube), giving cocurrent systems (for example an angle of 45°) or countercurrent systems (for example an angle of 135°), relative to the other current.

Use is preferably made, as rapid mixer, of a tangential jet mixer, a Hartridge-Roughton mixer or a vortex mixer (or precipitator), which derive from symmetrical T-shaped devices.

More particularly, in step (v), use may be made of a tangential jet, Hartridge-Roughton or vortex rapid mixer comprising a chamber having (a) at least two tangential admissions via which either, on the one hand, the silicate and, on the other hand, the medium resulting from the addition of acid to the reaction medium obtained from step (iv) or, on the one hand, the silicate and the acid and, on the other hand, the reaction medium obtained from step (iv) enter separately (but at the same time), and (b) an axial outlet via which the reaction medium obtained in this step (v) exits, preferably toward a reactor (vessel) arranged in series after said mixer. The two tangential admissions are preferably situated symmetrically and in opposing fashion with respect to the central axis of said chamber.

The chamber of the tangential jet, Hartridge-Roughton or vortex mixer optionally used generally has a circular cross section and is preferably cylindrical in shape.

Each tangential admission tube may have an internal diameter d from 0.5 to 80 mm.

This internal diameter d may be between 0.5 and 10 mm, in particular between 1 and 9 mm, for example between 2 and 7 mm. However, in particular on the industrial scale, it is preferably between 10 and 80 mm, in particular between 20 and 60 mm, for example between 30 and 50 mm.

The internal diameter of the chamber of the tangential jet, Hartridge-Roughton or vortex mixer optionally used may be between 3d and 6d, in particular between 3d and 5d, for example equal to 4d; the internal diameter of the axial outlet tube may be between 1d and 3d, in particular between 1.5d and 2.5d, for example equal to 2d.

The silicate and acid flow rates are, for example, determined so that, at the point of confluence, the two streams of reactants come into contact with one another in a region of sufficiently turbulent flow.

In the process according to the invention, on conclusion of step (v) (or of step (vi) where appropriate), optionally followed by maturation, a silica slurry is obtained and is subsequently separated (liquid/solid separation).

The separation performed in the preparation process according to the invention usually comprises a filtration, followed by washing if necessary. The filtration is performed according to any suitable method, for example by means of a filter press, a band filter, a filter under vacuum.

The silica suspension thus recovered (filter cake) is then dried.

This drying operation can be carried out according to any means known per se.

Preferably, the drying is carried out by atomization. To this end, use may be made of any type of suitable atomizer, in particular a rotary, nozzle, liquid pressure or two-fluid atomizer. In general, when the filtration is carried out using a filter press, a nozzle atomizer is used and, when the filtration is carried out using a vacuum filter, a rotary atomizer is used.

It should be noted that the filter cake is not always under conditions enabling atomization, especially on account of its high viscosity. In a manner known per se, the cake is then subjected to disintegration. This operation may be performed mechanically, by treating the cake in a mill of colloidal or ball type. The disintegration is generally performed in the presence of water and/or in the presence of an aluminum compound, in particular of sodium aluminate, and optionally in the presence of an acid as described previously (in the latter case, the aluminum compound and the acid are generally added simultaneously). The disintegration makes it possible especially to lower the viscosity of the suspension to be subsequently dried.

When the drying is performed using a nozzle atomizer, the silica capable of being then obtained is usually in the form of substantially spherical beads.

After drying, a milling step may then be performed on the recovered product. The silica capable of being then obtained is generally in the form of a powder.

When the drying is performed using a rotary atomizer, the silica capable of being then obtained may be in the form of a powder.

Finally, the product, dried (in particular by a rotary atomizer) or milled as indicated above may optionally be subjected to an agglomeration step, which consists, for example, of direct compression, wet granulation (i.e., with use of a binder, such as water, silica suspension, etc.), extrusion or, preferably, dry compacting. When the latter technique is employed, it may prove to be opportune, before carrying out the compacting, to deaerate (operation also referred to as predensifying or degassing) the pulverulent products so as to remove the air included in the latter and to ensure more uniform compacting.

The silica capable of being then obtained via this agglomeration step is generally in the form of granules.

The silica powders, and also the silica beads, obtained via the process according to the invention thus offer the advantage, inter alia, of affording access, in a simple, effective and economical manner, to granules, especially via conventional shaping operations, for instance granulation or compacting.

The precipitated silicas prepared via the process according to the invention are generally in at least one of the following forms: substantially spherical beads, powder, granules.

In general, the process according to the invention makes it possible to obtain silicas formed of aggregates of large primary silica particles, at the surface of which are small primary silica particles.

The implementation of the preparation process according to the invention, particularly when the concentrated acid used is concentrated sulfuric acid, makes it possible in particular to obtain during said process (after step (v) or the optional step (vi)) a suspension that is more concentrated in precipitated silica than that obtained via an identical process using only dilute acid, and thus a gain in precipitated silica productivity (which may be, for example, up to at least 10% to 40%), in particular in the precipitation reaction (i.e., after step (v) or the optional step (vi)), while at the same time being accompanied, surprisingly, by the production of precipitated silicas preferably having particular morphology, particle size distribution and porosity. More generally, the precipitated silicas obtained via the process according to the invention preferably have good dispersibility in polymers and give the latter a satisfactory compromise of properties, for example in their mechanical, dynamic and rheological properties, compared to those of the precipitated silicas obtained via an identical process using only dilute acid.

Advantageously, at the same time, especially when the concentrated acid used is concentrated sulfuric acid, the process according to the invention enables, relative to an identical process using only dilute acid, a saving (which may reach, for example, at least 15% to 60%) in the energy consumption (in the form of live steam, for example), in particular in the precipitation reaction (i.e., after step (v) or the optional step (vi)), due to a reduction in the amounts of water engaged and in the exothermicity linked to the use of concentrated acid. In addition, the use of concentrated acid makes it possible to restrict (for example by at least 15%) the amount of water required for the reaction, especially due to the reduction in the amount of water used for the preparation of the acid.

The precipitated silica prepared via the process according to the invention may be used in diverse applications. It may be used, for example, as a catalyst support, as an absorbent for active materials (in particular a support for liquids, especially those that are used in food, such as vitamins (vitamin E), choline chloride), in polymer, especially elastomer or silicone, compositions, as a viscosity enhancer, texturizer or anticaking agent, as a battery separator element, as an additive for toothpaste, for concrete, for paper.

It may be used for reinforcing natural or synthetic polymers.

The polymer compositions in which the precipitated silicas prepared via the process according to the invention may be used, especially as reinforcing filler, are generally based on one or more polymers or copolymers, in particular on one or more elastomers, especially thermoplastic elastomers, which preferably have at least one glass transition temperature between −150 and +300° C., for example between −150 and +20° C.

As possible polymers, mention may be made of diene polymers, in particular diene elastomers.

Mention may be made, as non-limiting examples of finished articles based on the polymer compositions described above, of footwear soles, tires, floor coverings, gas barriers, fire-retardant materials and also technical components such as cableway rollers, seals for domestic electrical appliances, seals for liquid or gas pipes, braking system seals, tubes (flexible), sheaths (especially cable sheaths), cables, engine supports, conveyor belts and transmission belts.

The invention claimed is:

1. A process for preparing precipitated silica, the process comprising:
    reacting an alkali metal M silicate with at least one acid using the following steps, whereby a silica suspension is obtained:
        (i) forming an initial aqueous stock comprising an alkali metal M silicate, the silicate concentration expressed as $SiO_2$ in said initial stock being less than 20 g/L,
        (ii) adding an acid to said initial stock to form a reaction medium, until at least 50% of the amount of $M_2O$ present in said initial stock is neutralized,
        (iii) simultaneously adding an alkali metal M silicate and an acid to the reaction medium, such that the ratio of the amount of silicate expressed as $SiO_2$ added in step (ii) to the amount of silicate expressed as $SiO_2$ present in the initial stock is greater than 4 and at most 100,
        (iv) stopping the addition of the alkali metal M silicate used in step (iii) while continuing the addition of an acid to the reaction medium until a pH value in the reaction medium of between 2.5 and 5.3 is obtained, and
        (v) placing the reaction medium in contact with an acid and a silicate, such that the pH of the reaction medium is maintained between 2.5 and 5.3,
    separating precipitate from the silica suspension; and
    drying the precipitate,
    wherein the process comprises one of the following conditions:
        (a) the acid used in step (ii), in at least part of step (iii) and/or in step (iv) is a sulfuric acid with a concentration of less than 20% by weight and the acid used in at least step (v) is a concentrated acid selected from the group consisting of sulfuric acid with a concentration of at least 80% by weight, acetic acid with a concentration of at least 90% by weight, formic acid with a concentration of at least 90% by weight, nitric acid with a concentration of at least 60% by weight, phosphoric acid with a concentration of at least 75% by weight, and hydrochloric acid with a concentration of at least 30% by weight; or
        (b) the acid used in step (ii), in step (iv) and/or in step (v) is sulfuric acid with a concentration of less than 20% by weight and the acid used in at least part of step (iii) is a concentrated acid selected from the group consisting of sulfuric acid with a concentration of at least 80% by weight, acetic acid with a concentration of at least 90% by weight, formic acid with a concentration of at least 90% by weight, nitric acid with a concentration of at least 60% by weight, phosphoric acid with a concentration of at least 75% by weight, and hydrochloric acid with a concentration of at least 30% by weight; or
        (c) the acid used in step (ii) is sulfuric acid with a concentration of less than 20% by weight and the acid used in at least part of said step (iii), in step (iv) and in step (v) is a concentrated acid selected from the group consisting of sulfuric acid with a concentration of at least 80% by weight, acetic acid with a concentration of at least 90% by weight, formic acid with a concentration of at least 90% by weight, nitric acid with a concentration of at least 60% by weight, phosphoric acid with a concentration of at least 75% by weight, and hydrochloric acid with a concentration of at least 30% by weight.

2. The process according to claim 1, wherein after the reaction medium is placed in contact with the acid and the silicate used in step (v), an alkaline agent is added to the obtained reaction medium, so as to increase the pH of the reaction medium to a value of between 4.7 and 6.3.

3. The process according to claim 1, wherein the process comprises condition (a) and wherein the acid used in at least part of step (iii) is a concentrated acid selected from the group consisting of sulfuric acid with a concentration of at least 80% by weight, acetic acid with a concentration of at least 90% by weight, formic acid with a concentration of at least 90% by weight, nitric acid with a concentration of at least 60% by weight, phosphoric acid with a concentration of at least 75% by weight, and hydrochloric acid with a concentration of at least 30% by weight.

4. The process according to claim 1, wherein the process comprises one of conditions (a) or (b) or (c) and wherein the acid used in step (iii) is a concentrated acid selected from the group consisting of sulfuric acid with a concentration of at least 80% by weight, acetic acid with a concentration of at least 90% by weight, formic acid with a concentration of at least 90% by weight, nitric acid with a concentration of at least 60% by weight, phosphoric acid with a concentration of at least 75% by weight, and hydrochloric acid with a concentration of at least 30% by weight.

5. The process according to claim 1, wherein the process comprises one of conditions (a) or (b) and wherein the acid used in step (iv) is a concentrated acid selected from the group consisting of sulfuric acid with a concentration of at least 80% by weight, acetic acid with a concentration of at least 90% by weight, formic acid with a concentration of at least 90% by weight, nitric acid with a concentration of at least 60% by weight, phosphoric acid with a concentration of at least 75% by weight, and hydrochloric acid with a concentration of at least 30% by weight.

6. The process according to claim 1, wherein the process comprises condition (b) and wherein the acid used in step (v) is a concentrated acid selected from the group consisting of sulfuric acid with a concentration of at least 80% by weight, acetic acid with a concentration of at least 90% by weight, formic acid with a concentration of at least 90% by weight, nitric acid with a concentration of at least 60% by weight, phosphoric acid with a concentration of at least 75% by weight, and hydrochloric acid with a concentration of at least 30% by weight.

7. The process according to claim 1, wherein the process comprises one of conditions (a) or (b) and wherein the acid used in part of step (ii) is a concentrated acid selected from the group consisting of sulfuric acid with a concentration of at least 80% by weight, acetic acid with a concentration of at least 90% by weight, formic acid with a concentration of at least 90% by weight, nitric acid with a concentration of at least 60% by weight, phosphoric acid with a concentration of at least 75% by weight, and hydrochloric acid with a concentration of at least 30% by weight.

8. The process according to claim 7, wherein the acid used in step (ii) is a concentrated acid selected from the group consisting of sulfuric acid with a concentration of at least 80% by weight, acetic acid with a concentration of at least 90% by weight, formic acid with a concentration of at least 90% by weight, nitric acid with a concentration of at least 60% by weight, phosphoric acid with a concentration of at least 75% by weight, and hydrochloric acid with a concentration of at least 30% by weight.

9. The process according to claim 1, wherein said concentrated acid is sulfuric acid with a concentration of at least 80% by weight.

10. The process according to claim 1, wherein said concentrated acid is sulfuric acid with a concentration of between 90% and 98% by weight.

11. The process according to claim 1, wherein the silicate concentration expressed as $SiO_2$ in said initial stock is at most 11 g/L.

12. The process according to claim 1, wherein the acid and an amount of alkali metal M silicate are simultaneously added in step (iii) to the reaction medium such that the ratio of the amount of silica added in step (iii) to the amount of silica present in the initial stock is between 12 and 50.

13. The process according to claim 1, wherein the amount of the acid added in step (iii) is such that 80% to 99% of the amount of $M_2O$ added is neutralized.

14. The process according to claim 1, wherein said drying is performed by atomization.

* * * * *